United States Patent [19]
Diot et al.

[11] Patent Number: 4,888,462
[45] Date of Patent: Dec. 19, 1989

[54] DEVICE AND PROCESS FOR MACHINING BY ELECTROEROSION

[75] Inventors: Jean-Claude Diot, Douvaine, France; Roger Girardin, Vernier, Switzerland

[73] Assignee: Charmilles Technologies S.A., Meyrin, Switzerland

[21] Appl. No.: 151,452

[22] Filed: Feb. 2, 1988

[30] Foreign Application Priority Data

Feb. 3, 1987 [CH] Switzerland ............................ 384/87

[51] Int. Cl.$^4$ ......................... B23H 1/00; B23H 7/02; B23H 7/28
[52] U.S. Cl. ................................ 219/69.2; 219/69.17; 219/69.12
[58] Field of Search .............. 219/69 D, 69 W, 69 M, 219/69 V, 69 S, 69 G, 69 C; 204/129.2, 129.25, 129.5, 129.7, 206, 224 M

[56] References Cited

U.S. PATENT DOCUMENTS 4,602,142  7/1986  Itoh ................................... 219/69 C

FOREIGN PATENT DOCUMENTS 129340  12/1984  European Pat. Off. ......... 219/69 W
137843  10/1980  Japan ................... 219/69 V
59-42218  3/1984  Japan ................... 219/69 W
1052359  11/1983  U.S.S.R. ............. 219/69 S

*Primary Examiner*—A. D. Pellinen
*Assistant Examiner*—Geoffrey S. Evans

[57] ABSTRACT

A device for machining by electroerosion has a tool electrode driven in a rotary motion controlled by a servomotor and showing the shape of a solid of revolution around its axis of rotation. A measuring circuit continuously evaluates the degree of contamination of the machining dielectric liquid in relation to a reference value. The measurement is made by a transducer for the instantaneous voltage $U_i$ of each spark and by comparing it to a predetermined value $U_b$, thus determining the proportion of so-called low-level sparks for which $U_i \leq U_b$, a signal being delivered when this proportion surpasses a predetermined threshold, or by a current transductor working during the waiting time preceding the striking of each spark, a signal being delivered when a predetermined current threshold is attained. A servo circuit modulates the rotation speed of the tool electrode as a function of this signal. The detector makes it possible to detect and remedy the appearance of ejected sparks.

24 Claims, 4 Drawing Sheets

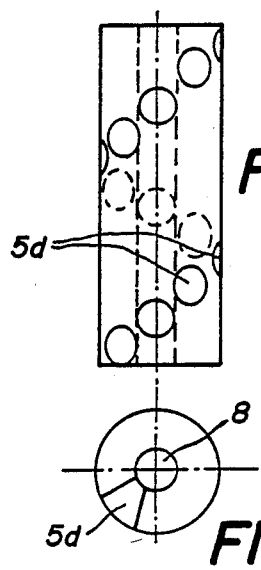
FIG.5
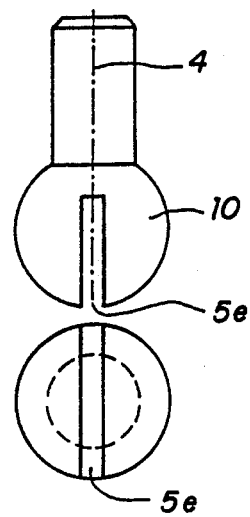
FIG.6
FIG.5
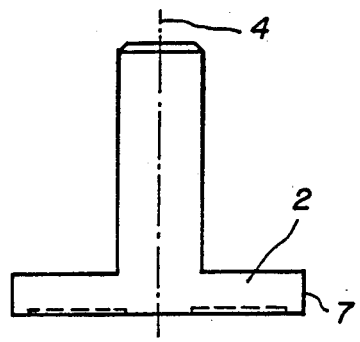
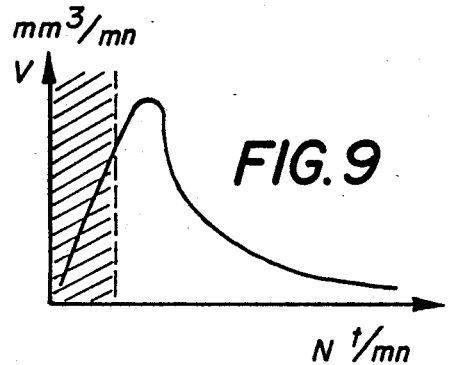
FIG.9
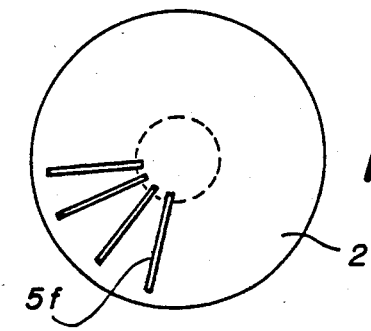
FIG.7

DEVICE AND PROCESS FOR MACHINING BY ELECTROEROSION

BACKGROUND OF THE INVENTION

I. Field of the Invention

The present invention relates to a device and a process for machining rapidly and with high current densities by electroerosion.

II. Description of the Relevant Art

It is known that, as compared with other more conventional methods, machining by EDM is a very precise but rather slow process. Thus it is of interest to improve the yield of the process, even if this means sacrificing a little precision, which is of little consequence in certain cases, such as in a blank for example.

The main reason for the slowness of EDM machining at present is the fragility of the machining dielectric liquid trapped in the space separating the tool electrode and the work to be machined, called the machining slot or "gap", where it is carbonized, vaporized, ionized, etc., by reason of the temperature rise caused by the sparks which strike between these electrodes, and contaminated by the waste material due to the erosion. Since this "gap" is narrow, generally of the order of 0.005 mm to 0.1 mm, it is difficult to eliminate from it the waste material due to the degradation of the dielectric and to erosion and to renew the latter.

The dielectric liquid most often consists of hydrocarbons and/or water which may contain various additives. The tools most commonly used are either a fine metal wire (with a diameter of some tenths of a millimeter) fed continuously along the work to be machined, or for a sinking electrode.

There are different methods of injecting the liquid into the gap for accelerating the renewal of the dielectric. Although effective to a certain degree, all of these methods find an obstacle in the narrowness of the gap, which prevents a rapid circulation of the liquid which it contains. The destruction of the dielectric and the deterioration of the machining conditions which it brings with it are obviously less rapid during so-called "open geometry" machinings where some renewal of the dielectric is possible than when it is necessary to operate "in closed geometry".

Moreover, in the latter case the gases resulting from the electroerosion and the decomposition of the dielectric are then trapped in the gap and cause the appearance of surface defects. It is mainly for the purpose of avoiding or retarding this decomposition of the dielectric that it has become customary at the start of the machining to limit the intensity of the machining current and consequently the amount of material removed per unit time.

When, despite this precaution, the dielectric starts to degrade during the machining, the known countermeasures range from a temporary intensification of the forced injection of liquid into the gap, due to a device such as that described in British Pat. No. 2,074,074 for example, to an enlargement of the latter or to a decrease in the mean intensity per unit surface of the tool electrode (or density) of the machining current, or to the establishment of a pulsation motion of the tool electrode or else to an increase of the period of rest between successive pulses. Except for the first of these, they all result in reducing the mean current density. The first measure is often ineffective or inapplicable in most of the closed geometries because the flux of the dielectric is non-homogeneous, and the others slow down or interrupt the machining, which reduces its yield. Until the present, it was traditionally necessary to limit oneself to moderate machining current densities, not in excess of 10 amp./cm$^2$, even when certain countermeasures were adopted, so as to avoid having to lock these in solidly, thus destabilizing the machining. This is why it was customary to machine at slow speed.

SUMMARY OF THE PRESENT INVENTION

The present invention provides a device and a process for rapid machining by electroerosion using high current densities.

In brief, the device of the present invention includes a tool electrode driven in a rotary or linear motion in addition to the normal feed motion along the machining path, at least one measuring circuit and at least one servo circuit.

The measuring circuit is arranged to determine the degree of contamination corresponding to each spark of the dielectric liquid bathing the machining gap and to compare it to a reference degree of contamination. If the reference value is reached or surpassed, the measuring circuit delivers an appropriate signal. The servo circuit is arranged to modulate, as a function of this signal, either the rotation frequency of a rotary tool electrode or the acceleration of the feed rate of a wire electrode.

The process of the present invention utilizes such a device to improve the circulation of a dielectric liquid in the machining zone and to make possible machining with a current density greater than 10 amp./cm$^2$. Concurrently, the degree of contamination of this liquid in the machining gap is being determined for each spark. Either the acceleration of the wire electrode or the rotation speed of the tool electrode is modulated as a function of this degree in such a way as to maintain a critical situation in which the degree of contamination which is slightly less than that which would cause the destruction of the dielectric liquid corresponds to the maximum removal of material.

Contrary to this teaching of the state of the art, the invention aims to avoid limiting at the outset the machining current density and consequently to permit greater removals of material. But most of all, machining with a high current density makes it possible to work with electrodes of small size for machining works of large size, whereas traditionally the EDM electrode has substantially the same overall size as the cavity to be sunk.

Consequently an efficient management and mass production of the electrodes can be considered, and thus a reduced sale price of the EDM electrode, which is traditionally fabricated to size for each special machining.

One of the aims of the present invention consists in slowing down the degradation or even preventing the destruction of the dielectric while accelerating its renewal in the gap by an improvement in its circulation thanks to a rotary tool electrode or a wire electrode with an accelerated feed rate, and in thus machining with a current density much greater than the densities traditional in EDM (10 amp./cm$^2$).

A second aim consists in detecting the symptoms foretelling the degradation of the destruction of the dielectric, delivering a corresponding signal and adjusting the rotation frequency of the electrode or its feed rate in response to this signal so as to increase the circulation of the dielectric in the gap, thus remedying its degradation, and avoiding a total deterioration of the machining conditions.

A third aim is to maintain permanently an ideal and constant degree of contamination of the dielectric corresponding to a dielectric at the limit of its destruction. Indeed, it has been found that this "critical situation" (where the dielectric present in the gap shows such a degree of contamination that it is on the verge of its destruction and that there is a danger of stopping the machining) corresponds to a maximum removal of material and thus to an optimum yield. EDM cutting tests have confirmed that for a given current density there is an optimum rotation speed of the electrode which corresponds to a maximum removal of material (see FIG. 9, the hatched part of which corresponds to a blocked machining). It is possible to arrange a servo mechanism for the rotation of the tool electrode showing a sufficiently low response time to maintain such a "critical situation" by monitoring the instantaneous voltage of each spark, and consequently by regulating the rotation speed of the tool electrode or its feed rate.

Indeed, one of the detectable symptoms which are good indications of the degradation of the dielectric is an excessive decrease in this instantaneous spark voltage, that is the appearance of "low-level" sparks, that is to say of sparks the voltage of which drops below an instantaneous voltage $U_b$ which is less than a predetermined value. This predetermined value may, for example, be close to the mean reference machining voltage $U_{ref}$. In fact the "feed rate" of the tool electrode is regulated by keeping the mean machining voltage between the tool electrode and the work to be machined at a value around this mean reference machining voltage $U_{ref}$. "Feed rate" is understood to mean the rate of reciprocal motion between the tool electrode and the work along the machining path.

The extra motion of the electrode has the effect of promoting the renewal of the dielectric in the machining gap. The waste material due to erosion and to the decomposition of the dielectric may now be evacuated from the machining zone at the rate at which they are produced, even for a high current density, without interrupting or slowing down the machining. The flow rate of the used dielectric as well as that of the new dielectric may thus be proportioned by adjusting the rotation speed of a rotary electrode or the acceleration of a wire electrode.

The rotation frequency of the electrode or its feed rate will preferably be controlled in such a way that the ratio of low-level sparks does not exceed a predetermined reference value which makes it possible to keep the machining in the "critical situation" described above. This is an ideal ratio, corresponding to a sufficiently high degree of contamination of the machining gap so that the removal of material will be as great as possible for the current density used, but slightly below that which would cause a deterioration of the machining conditions or even its complete stoppage as a result of the destruction of the dielectric. In particular, it makes allowance for short-circuits. This control makes it possible to obtain the optimum rotation speed corresponding to the maximum removal of material for a given current density.

However, if this reference proportion of low-level sparks and thus this critical situation corresponding to an optimum removal of material was not attainable despite a minimum rotation speed, it would then be necessary to reduce the mean spacing between the electrodes (called the "gap") and consequently to reduce this reference voltage $U_{ref}$ in order to be able to machine with an optimum removal of material.

Measuring the instantaneous voltage of each spark offers another very great advantage: it makes it possible to monitor the sparks ejected. Indeed, the rotation of the tool electrode causes the following parasitic phenomenon: the sparks strike in the gap, but a fraction of them may be ejected from the gap to the outer medium by the motion of the dielectric caused by the rotation of the electrode. This type of sparks, called "ejected" sparks, lose their erosion power, causing the vaporization of the dielectric, and generate irregular surface stages. They are distinguished by an increase of the instantaneous voltage as a function of time. In order for the first sparks ejected to appear, the tangential velocity of the electrode must be sufficient for a point on its surface to describe a distance close to the value of the gap during the period of the spark (100 $\mu$s for example). Their appearance signals that it is useless, even dangerous, to increase the acceleration of the rotation of the tool electrode.

Thanks to the device of the present invention, it is possible to avoid the negative effects of the ejected sparks. In particular it is possible to interrupt the spark in progress by switching off the machining current, and this at the time of the detection of an excessive rise in the instantaneous spark voltage.

When the ratio of ejected sparks exceeds a certain value by reason of an acceleration in the rotation of the electrode, it is also possible to slow down the rotation and/or reduce the power of the sparks, for example by increasing the rest period between two successive pulses or by reducing the intensity of these pulses, or else by reducing their duration or increasing the gap.

We may add that providing servo operation of the rotation of the tool electrode, controlled dependent on the results of the measurement of the instantaneous voltage of each spark, makes it possible to obtain at each instant of machining the optimum rotation frequency regardless of:

the dimensions and shape of the tool electrode,
the "material contact", (that is, the active surface subjected to electroerosion) of the electrodes,
the duration of the spark,
the local conditions of injection, circulation and renewal of the machining fluid and of cooling in the gap,
the mean power applied by the generator,
the depth of the gap, and
the materials making up the electrodes and the machining dielectric liquid.

The device for electroeroding at a high current density according to the present invention and its use may show an infinity of embodiments. Only certain ones will be illustrated diagrammatically by a description of examples of their construction, with the aid of the annexed drawings in which:

BRIEF DESCRIPTION OF THE DRAWINGS

FIGS. 2a, 2b, 3, 4, 5, 6 and 7 represent shapes of tool electrodes which can be used in this device;

FIG. 9 illustrates the variation in flow rate of the material as a function of the rotation speed of the electrode;

DETAILED DESCRIPTION OF THE PREFERRED EMBODIMENTS

Figure 1:
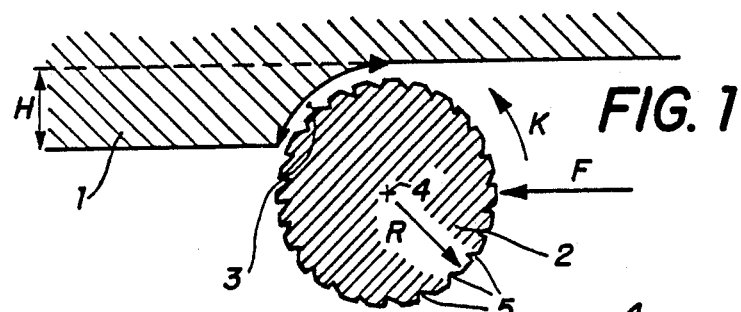
FIG. 1 diagrammatically shows one of the operating principles of the device according to the invention.
Figures 2A, 2B:
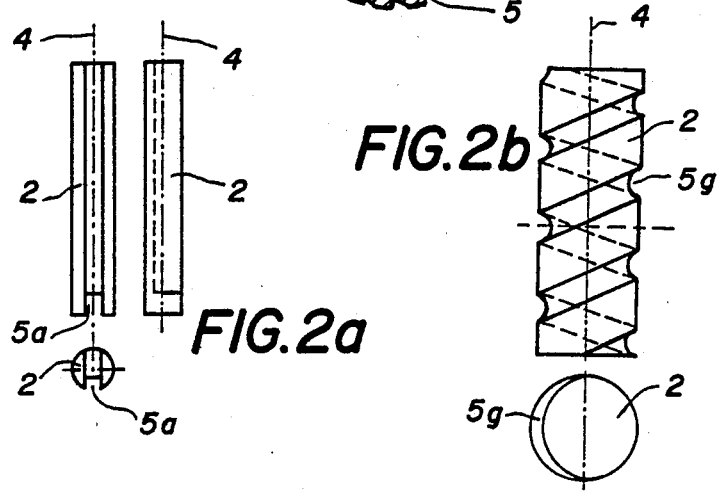
Figures 3, 4:
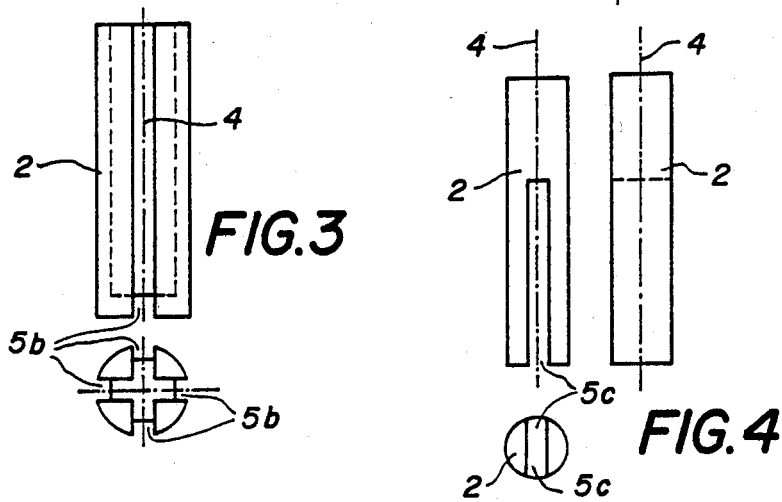

In FIG. 1, 1 is the work to be machined and 2 a cylindrical tool electrode serving for machining and intended to remove a height H of material from the work. The arrow F indicates the direction in which the electrode 2 progresses with respect to the work 1, which is considered immobile, and from which it is separated by the gap 3 in which the sparks are generated. In addition to the feed motion of the tool electrode in the direction indicated by the arrow F, the electrode rotates around its axis 4 in the direction indicated by the arrow K, in a manner somewhat similar to that of a mechanical cutter. The rotation speed may vary within a broad range. As an indication, it may for example range between 50 and 5,000 rpm for an electrode having a radius R ranging between 2 and 30 mm. This rotation, the direction of which may moreover be reversed as the case may be, brings fresh dielectric into the gap 3 and evacuates the degraded dielectric as well as the residues and gas bubbles resulting from its decomposition. To improve the renewal of the liquid in the gap 3 still further, the electrode 2 has at its periphery grooves 5 which act as vanes. These grooves may be "straight", that is arranged parallel to the axis 4 of the cylinder, or else spiral. This latter possibility, which shows considerable advantages, in machining, is represented in FIG. 2b.

The active surface of the electrode 2 may for example include at least 75% of the surface of the cylinder (the rest being occupied by the grooves) but other values are possible depending on the cases. To obtain a stable yield it is preferable to use an electrode showing a constant proportion of active surface over the whole length of the cylinder, which is the case with spiral grooves.

FIGS. 2 to 5 show some preferred forms of quasi-cylindrical electrodes, with a groove 5a with a single closed end (FIG. 2a), with a spiral groove 5g (FIG. 2b), with a quadruple groove 5b (FIG. 3), with a through groove 5c (FIG. 4), and a tubular one with bored holes 5d in a radial direction (FIG. 5). The longitudinal grooves 5a and 5b may empty into one or more foot grooves (not represented).

In these figures the elements corresponding to those of FIG. 1 bear the same reference numbers as in the latter.

The cylindrical electrodes of FIGS. 2 to 5 are mainly intended to sink holes or cavities in the piece to be machined. This is why their grooves 5a, 5b, 5c, while they play a part similar to that of the grooves 5 of the electrode in FIG. 1, are more particularly suited for a forced injection of machining liquid. This applies particularly to the embodiment of FIG. 5 where the grooves are replaced by radial holes 5d communicating with a central channel 8 which may be closed or open at its free end. Then a forced circulation of machining liquid can be created in the gap by injection of the liquid into this channel at its end near the tool holder.

To improve the renewal of the dielectric in the gap, electrodes with an uneven surface (not represented), which in general have few or no grooves, may also be used.

It is understood that the shapes of electrodes illustrated in FIGS. 2 to 5 show no limiting character. A large variety of electrodes showing other shapes, for example non-cylindrical shapes or those provided with other types of grooves or holes communicating with a supply line for dielectric, provided in the interior of the electrode or passing all the way through the electrode, can be used advantageously.

In particular, it may be advantageous to use a tool electrode such as that shown in FIG. 6, the useful surface of which is essentially spherical and which is provided with a groove 5e or one in the manner of FIG. 7, which diagrammatically shows an electrode in disk form. In the latter case, only radial straight grooves 5f closed at both ends have been outlined.

Other embodiments are possible, for example open or closed spiral grooves, or else a forced feed system similar to that of FIG. 5. Moreover, a toothing (not represented) may be provided on the outer rim 7 of the disk, particularly when the latter serves as an attack edge during electroerosion.

The advantage of these grooves, moldings, reliefs and various holes is to improve the driving of the liquid and to regularize and accelerate its renewal in the machining gap. This channels toward the outside of the gap the flow of gas and of particles produced by the erosion of the electrodes and the decomposition of the dielectric. They feed the machining gap with new dielectric and promote the cooling of the electrodes and of the dielectric bathing this gap.

Figure 8:
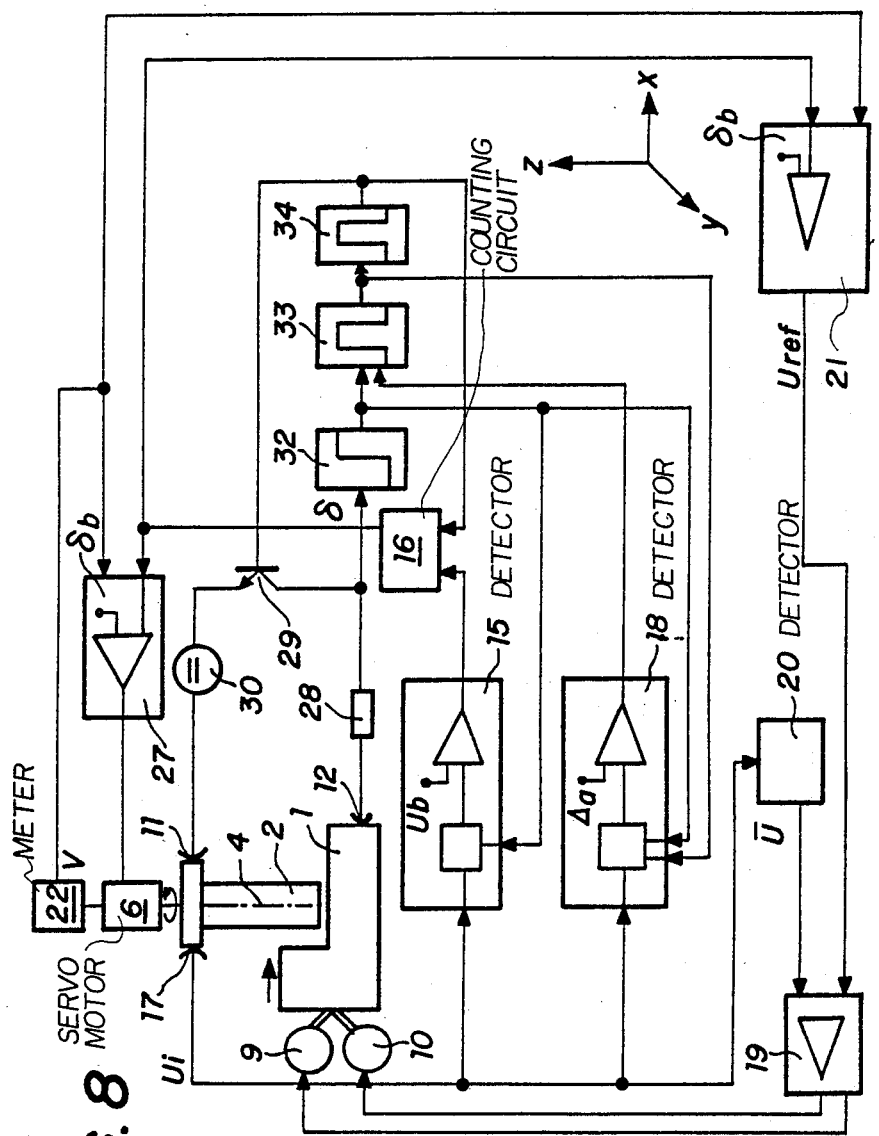
FIG. 8 describes a device according to the present invention.

A variant of the device according to the present invention is illustrated in FIG. 8, in which a conducting work 1 is machined by means of a rotary tool electrode 2 the rotation of which around its axis of symmetry 4 is controlled by the servomotor 6. Two other servomotors 9 and 10 control the motions of an X-Y coordinate table, not represented, ensuring relative translational motions between the work 1 and the electrode 2. These translational motions are made in the directions of the axes of the cartesian coordinates x and y, perpendicularly to the axis 4 and located in a plane perpendicular to the plane of FIG. 8.

The contacts 11 and 12 respectively lead to the electrode 2 and to the work 1 the machining current delivered by a pulse generator making sparks strike between the piece 1 and the electrode 2.

The servomotors 6, 9 and 10 are controlled by a digital control unit of the type known in EDM, not represented, as well as by a servo circuit described further on.

The pulse generating circuit has a voltage source 30 mounted in series with an electronic interrupter 29, shown diagrammatically in the form of a transistor, a variable resistance 28 making it possible to limit the intensity of the machining current, a Schmitt flip-flop circuit 32 for detecting the striking of a discharge and two monostable flip-flop circuits 33 and 34 for respectively fixing the maximum duration of the voltage pulse $T_P$ and that of the interval between two successive voltage pulses, $T_o$.

A circuit for measuring the instantaneous spark voltage $U_i$ has the contact 17 on the electrode 2 connected to a first detector 15 having a voltage transducer connected to a flip-flop circuit 32. This detector indicates to the transducer the start of each spark so as to allow it to measure the instantaneous voltage $U_i$ at the start of each spark. The detector 15 also has a comparator so as to compare the voltage thus measured to a reference value $U_b$ (in this example, $U_b=20$ v.), thus permitting it to detect the low-level sparks, that is, those for which $U_i \leq U_b$. This measuring circuit also has a counting circuit 16 which determines the instantaneous proportion of low-level sparks $\delta$. The contact 17 is also connected to the detector 18 having a voltage transducer connected to both of the flip-flop circuits 32 and 33. These indicate to it the start and the end of the sparks so as to allow it to determine the derivative $\Delta$ of the instantaneous voltage as a function of time and during each spark. This detector 18 also has a comparator comparing this derivative $\Delta$ to a reference value $\Delta_a$, thus permitting it to detect the sparks ejected, that is those for which $\Delta \geq \Delta_a$. Finally, this circuit also has a detector 20 having a voltage transducer as well as a computing circuit making it possible for it to determine the mean value $\overline{U}$ from the instantaneous (or machining) voltages measured continuously during the machining.

A servo circuit has the amplifier 27 connected to the servomotor 6, a counting circuit 16 and a voltage generator 21 delivering a mean reference voltage $U_{ref}$ (here, $U_{ref}=25$ v). This generator 21 is arranged in such a way as to adjust the value of $U_{ref}$ so that the ideal proportion of low-level sparks $\delta_b$ (here $\delta_b = 5\%$) may be obtained with rotation speeds compatible with the possibilities of the servomotor 6. This make it possible to control the rotation speed of the electrode 2 in such a way that $\delta \leq \delta_b$. This circuit also has an amplifier 19 itself connected to the detector 20 and to the servomotors 9 and 10 as well as to the generator 21 in such a way as to control the feed rate of the electrode 2, that is the speed of the relative translational motion of the electrode 2 and of the work 1 in such a way that $\overline{U}$ remains close to $U_{ref}$ throughout. A tachometer 22 connected with the servomotor 6, the amplifier 27 and the generator 21 makes it possible to measure the instantaneous rotation speed V of the electrode 2.

At the start of the machining cycle the detector 15 measures the instantaneous spark voltage $U_i$ and compares it to the reference value $U_b$. The circuit 16 takes account of every low-level spark, that is, any measurement for which $U_i < U_b$, and thus determines the instantaneous proportion of low-level sparks $\delta$.

The amplifier-comparator 27 compares this instantaneous proportion $\delta$ to a predetermined reference proportion $\delta_b$, defined in the introduction which corresponds to the maximum yield.

Moreover, it controls the servomotor 6 so as to control the rotation speed V of the electrode 2 in such a way that $\delta \leq \delta_b$, $\delta$ being as close as possible to $\delta_b$ without ever exceeding it. In fact, when $\delta \geq \delta_b$, the amplifier 27 orders an increase in the rotation speed V, which causes $\delta$ to decrease. When $\delta$ reaches the value $\delta_b$, the amplifier 27 keeps the speed V constant. If $\delta$ decreases in deviating from the value $\delta_b$, the amplifier 27 orders a decrease in the frequency V until $\delta$ reaches the value $\delta_b$. In this example the rotation speed V may vary from 50 rpm to 5,000 rpm. With a peak current of 48 amp. for example, it has been possible to achieve a removal of material of 355 mm$^3$/min. in a treated tool steel.

This installation makes it possible not only to servo-control the rotation speed of the electrode 2 as a function of the instantaneous spark voltage, but also to servo-control the rate of feed.

In fact, the amplifier 19 compares the mean voltage $\overline{U}$ calculated by 20 to the reference value $U_{ref}$ delivered by the generator 21 and controls the servomotors 9 and 10 in such a way as to keep $\overline{U}$ substantially equal to $U_{ref}$, the value of the mean reference machining voltage (here, $U_{ref}=25$ v).

This installation likewise makes it possible to avoid ejected sparks and thus the corresponding surface defects. In fact, the detector 18 compares the derivative $\Delta$ of the instantaneous spark voltage to the reference value $\Delta_a$. If a $\Delta \geq \Delta_a$, the spark is interrupted by the flip-flop circuit 33.

If, when the electrode 2 is set in rotation at its minimum speed, the comparator 27 detects a proportion $\delta \leq \delta_b$, the generator 21 orders a decrease in the machining gap, by a circuit not represented, so as to adjust $U_{ref}$ chosen initially. On the contrary if, when the electrode 2 is set in rotation at its maximum speed, the comparator 27 detects a proportion $\delta \geq \delta_b$, then the generator 21 orders an increase in the gap so as to adjust $U_{ref}$ to a value higher than the initial value.

Other variants of such an installation may of course prove very advantageous. For example the servo circuit and the digital control (not represented) can be connected to a servomotor which can vertically drive the electrode 2 along the axis of rotation 4 of the electrode 2. This connection is made through a supplementary comparator in such a way as to regulate the speed of this motion, for example a reciprocating motion, in such a way that $\delta$ remains equal to or less than $\delta_b$. Then it is advantageous to use an electrode also provided with grooves orthogonal to the Z axis.

Figure 10:
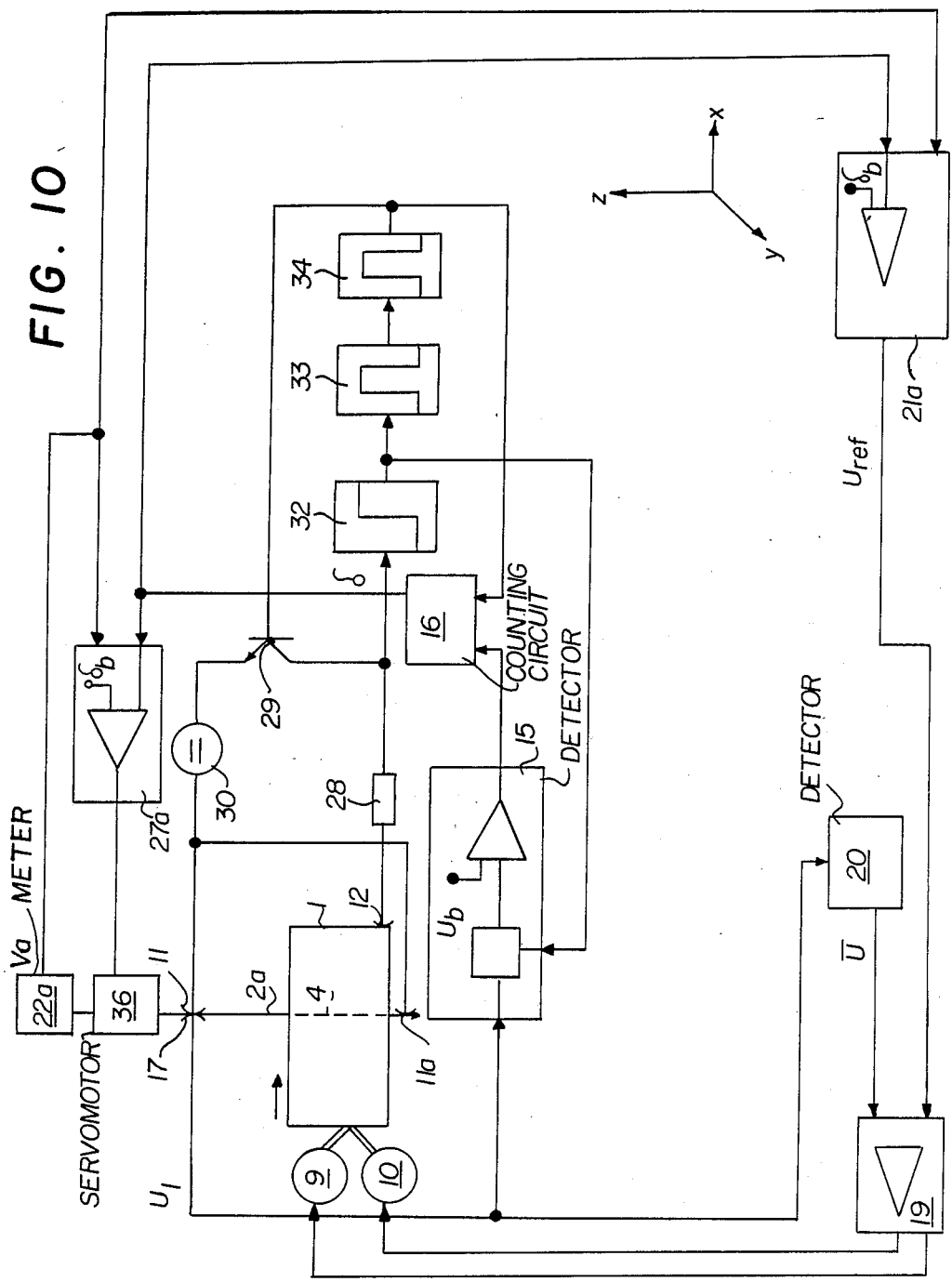
FIG. 10 shows another device according to the present invention.

It is also possible to use as the tool electrode not a rotary electrode but an electrode driven in a linear motion parallel to the machining surface, and in particular parallel to the Z axis of cartesian coordinates. A device incorporating such a travelling wire electrode 2a is shown in FIG. 10. The device is substantially comparable to that shown in FIG. 8, the similarly numbered elements of each serving the same functions. The wire electrode 2a crosses the workpiece 1 to be machined all the way through, passing continuously into the machining zone, this motion being accelerated to promote the renewal of the liquid in the gap. This acceleration may be servo-controlled as a function of the degree of contamination of the dielectric so as to maintain the "critical situation" as described above, for servo control of the frequency of rotation of a rotary electrode.

In the device shown in FIG. 10 a servomotor 36 controls the acceleration of the travelling rate or linear speed Va of the wire electrode 2a. Current is delivered to the wire electrode by a pair of contacts 11 and 11a. The servocircuit for controlling the servomotor 36 includes the elements recited in respect to the servomotor 6, except for the detector 18 and its related circuitry. However, in the device of FIG. 10 a generator 21a is arranged so as to adjust the value of $U_{ref}$ so that the ideal proportion of low-level sparks $\delta_b$ can be obtained with linear speeds compatible with the servomotor 36. The linear speed of the wire electrode 2a is then controlled in such a way that $\delta \leq \delta_b$. The instantaneous linear speed of the wire electrode 2a is measured by the servomotor 36, an amplifier 27a and an appropriate meter 22a. The amplifier 27a compares the instantaneous proportion $\delta$ to the predetermined reference proportion $\delta_b$ and controls the servomotor 36 so as to control the linear speed of the wire electrode 2a so that $\delta \leq \delta_b$. When $\delta \geq \delta_b$, the amplifier 27a orders an increase in the linear speed which causes $\delta$ to decrease. When $\delta$ reaches $\delta_b$, the amplifier 27a orders a decrease in the linear speed until $\delta$ reaches a value $\delta_b$.

The installation of FIG. 10 allows control of the workpiece feed rate in a way similar to the device shown in FIG. 8 so as to keep U substantially equal to $U_{ref}$. The comparator 27a, in detecting $\delta \geq \delta_b$ while the linear speed of the wire electrode 2a is at its minimum, will order a decrease in the machining gap, so as to adjust $U_{ref}$ chosen initially. On the contrary, when the wire electrode 2a is set at its maximum linear speed, if the comparator 27a detects a proportion $\delta \geq \delta_b$, the generator 21a orders an increase in the gap to adjust $U_{ref}$ to a value higher than its initial value. The wire may be reused, which has little wear due to its rapid feed, to limit its consumption. Grooves or recesses, preferably those perpendicular to this linear motion, may be provided, which are intended to promote the circulation of the dielectric in the machining zone.

It is possible not only to combine the feed motion of the tool electrode along the machining path with an angular motion tangential to the machining surface or with a linear motion parallel to this surface, but also to combine these three types of motions. Also a rotation of the electrode tangentially to the machined surface can be combined with a reciprocatring motion parallel to its axis of rotation (and thus to this surface). Also the electrode, while rotating on itself, may execute a second rotation around an axis parallel to the axis of this first rotation but separate from the latter. These rotary or linear motions may also be combined with various pulsations, vibrations or oscillations of the electrode, for example those such as the micro-paths described in Swiss Patent No. 646,894, as well as various linear or angular reciprocating motions.

The axis of symmetry 4 of the tool electrode 2 or 2a is not necessarily perpendicular to the feed direction F (see FIG. 1) of the tool electrode relative to the work to be machined. This inclination may vary during the machining. It is also possible to move the work 1 linearly or angularly relative to the tool electrode 2, thus for example performing an "EDM turning" instead of an "EDM cutting".

Instead of monitoring the trend of the degree of contamination of the dielectric by measuring the instantaneous spark voltage, it is conceivable to measure another gap parameter characteristic of this degree of contamination, such as for example the resistivity of the dielectric. The resistivity of the dielectric may be determined by measuring a current during the waiting time generally preceding the striking of the spark. Now in the process described here we seek to minimize the mean waiting time, and consequently the measuring time is in danger of being reduced to nil during the critical phases.

Measuring the resistivity of the dielectric may be done during the pause between two successive sparks, but then an auxiliary source must be provided, which leads to a complicated device.

Moreover, such measurements of resistivity do not give a complete understanding of the contamination. They make it possible to detect a contamination due to excesses of suspended particles in the dielectric, which tends to reduce its resistivity, but not an increase in its content of gas bubbles, which on the contrary tends to increase its resistivity.

Instead of suppressing the ejected sparks by interrupting the spark, different devices may be provided making it possible to slow down the rotation of the electrode and/or reduce the mean power of the sparks and/or reduce their durations and/or increase the gap, in response to a signal delivered by the detector 18 and indicating that the derivative of the instantaneous spark voltage is greater than a reference value $\Delta_a$.

As has been seen above, the principal advantage of the device and the process of the present invention is to make it possible to operate with a machining current density uncommon in EDM, that is one above 10 amp./cm², preferably above 50 amp./cm². This in particular permits not only boring or drilling circular holes, broaching and polishing as was already possible in EDM with known rotary tool electrodes, but also performing a real "milling" by erosive sparking. With an electrode of very simple shape, very complicated shapes can now be machined. Most of all, due to this high current density, it is possible to machine pieces with large sizes with electrodes of small sizes, contrary to the traditional electroerosion where the tool electrode has substantially the same volume as the cavity to be eroded.

These electrodes, having simple shapes, may be produced in mass production, similarly to the wire electrodes already known. This makes possible considerable progress in relation to the traditional sinking electrode made to size for each particular machining.

It is even possible to make shapes which could be obtained only with great difficulty in classic cutting, such as T-shaped grooves for example, or molds for reinforcing walls or other shapes having long straight cavities, made of plates of hardened steel. In fact, according to the present invention, long narrow tool electrodes can be used in EDM milling, while conventional milling tools must be massive to be effective, for otherwise it is obligatory to cut more slowly to prevent breaking the tool.

Moreover, since the device and the process of the present invention make it possible to keep the machining permanently in a "critical situation" (as described above) which corresponds to the maximum amount of material which can be eroded for a given power, the machining can even be optimized in operating with the best possible yield. We may add that it is no longer necessary to have recourse to known countermeasures to stabilize the machining. Thus the slowing down or interruption of the latter is avoided, which eliminates any loss of yield. Thanks to a new parameter, the rotation speed of the electrode, or the wire feed rate in the case of a wire electrode, it is possible to operate at a maximum feed rate.

The reduction in the gap due to the high feed rates and the reduction in the service life of the machining dielectric liquid resulting from this are compensated for by simply increasing the rotation frequency of the electrode.

All of this makes it possible to machine with high stability at a maximum speed and with a maximum yield.

These also show the advantage of having a great simplicity as regards the results obtained. In fact, with only one type of transducer they make it possible to allow for numerous independent parameters: attack surface, depth of gap, size and shape of the tool electrode, materials present, local circulation conditions and conditions of renewal of the dielectric through the gap, machining current density, etc. Optimizing may be done by acting mainly on a single parameter: the rotation speed or the feed rate of the tool electrode. Moreover, since in any case it is necessary to measure the instantaneous spark voltage in order to adjust the feed rate, it is not necessary to provide transducers and extra measures in order to put the present invention into practice. The element making it possible to measure the instantaneous spark voltage already existed in the usual EDM machines.

The importance of the present invention is increased still further by the fact that up to the present no transducers are known which are capable of monitoring certain parameters mentioned above in real time, particularly the active surface (or "material contact"), the depth of the gap or the shape of the machined piece, which moreover may be extremely variable during machining.

Since it is sufficient to act continuously on a single parameter, it is easy to optimize the machining by stabilizing the machining permanently at the critical situation already mentioned (in which the dielectric is kept in the vicinity of its destruction), while avoiding the destruction of the dielectric. Since this action is an acceleration of a linear or rotary motion, the mechanical inertia to be overcome is small, hence there is a slow response time and a good "nervousness" of the system. The renewal of the dielectric present in the gap is thus accelerated and regularized in a homogeneous, continuous manner when necessary. Contrary to the known devices and processes, the present invention thus makes it possible, while keeping to a maximum yield and machining speed, to avert any danger of destruction of the dielectric and avoid any degradation of the surfaces machined resulting from bad machining conditions or the appearance of a too high proportion of gas bubbles and ejected sparks.

By reason of its simplicity, its versatility and its flexibility, the device of the present invention makes it possible, particularly due to the rapidity of its response, to compensate for sudden and unforseeable variations in the active surface. In fact, as in conventional milling, the active surface, that is the surface subjected to erosion, may vary enormously and in an unexpected way, especially when a semi-finishing pass is involved, where the surface for machining has been roughed down in advance by any known process, EDM or not. Then it is not possible to provide variations in the "material contact" (or "active surface" or "attack surface") such as for example the height H illustrated in FIG. 1.

When the surface to be machined shows great irregularities, in conventional milling the operation is generally done at slow speed so as to allow for the worst possible situation. This precaution is no longer of use with the device of the present invention, for it is flexible enough to make the speed of the tool electrode vary very rapidly so as to compensate for the variation in the material contact, and this without any destruction of the dielectric having time to take place.

Moreover, any form of tool electrode may be adapted to the device of the present invention. The latter makes it possible in effect to control the rotation speed of a tool electrode regardless of the size and shape of the latter without requiring any change in programming.

Thus, thanks to the stability and reliability contributed to machining by the device of the present invention and likewise thanks to its simplicity, this device contributes to easily automating in a very satisfactory manner a high-speed EDM machining.

What is claimed is:

1. A device for electroerosive machining of a workpiece in the presence of a machining fluid, comprising:
   a tool electrode spaced from said work piece a distance defining a machining gap in which a portion of said fluid is circulated, said electrode being adapted to erode said workpiece by development of a series of sparks between them in said machining gap, said electrode being mobile with respect to said workpiece in a feed direction, and said electrode also being mobile with respect to said workpiece in a second direction different from said feed direction;
   measuring circuit means for: (a) determining, in correspondence to each spark in said series of sparks, the degree of contamination of said portion of said machining fluid circulating in said gap; (b) comparing said determined degree of contamination with a reference degree of contamination; and (c) delivering a signal when said determined degree of contamination is at least equal to said reference degree of contamination; and
   at least one servo circuit means for modulating movement of said electrode in said second direction as a function of said signal.

2. The device as claimed in claim 1, wherein said second direction is a rotary direction.

3. The device as claimed in claim 1, wherein said second direction is a linear direction.

4. The device as claimed in claim 2, wherein said electrode is a rotary tool electrode.

5. The device as claimed in claim 3, wherein said electrode is a wire electrode.

6. The device as claimed in claim 4, wherein said servo circuit means modulates the rotational frequency of said electrode.

7. The device as claimed in claim 5, wherein said servo circuit means modulates the acceleration of the travelling rate of said electrode.

8. The device as claimed in claim 2, wherein said measuring circuit means and said servo circuit means include elements suitable for at least one of: detecting the appearance of ejected sparks; delivering in response to said delivered signal a second corresponding signal for interrupting the one of said series of sparks immediately following said delivered signal; and determining the proportion of ejected sparks.

9. The device as claimed in claim 8, wherein said elements are of the type adapted to at least one of: slow the rotational frequency of said electrode; reduce the mean power supplied to said electrode; reduce the duration of the sparks in said series of sparks; and increase said distance defining said machining gap.

10. The device as claimed in claim 1, wherein said measuring circuit means comprises a detector for determining the derivative $\Delta$ of the instantaneous voltage of each spark in said series of sparks, a comparator for comparing said derivative $\Delta$ with a predetermined reference value $\Delta_a$, and an element delivering said signal when $\Delta$ is greater than or equal to $\Delta_a$.

11. The device as claimed in claim 1, wherein said measuring circuit means comprises a transducer for measuring the instantaneous voltage $U_i$ of each spark in said series of sparks, a comparator for comparing said instantaneous voltage $U_i$ with a predetermined reference value $U_b$, and a counting circuit for determining a proportion $\delta$ of low-level sparks, for which $U_i$ is less than or equal to $U_b$, and for comparing that proportion $\delta$ to a predetermined reference proportion $\delta_b$.

12. The device as claimed in claim 1, wherein said measuring circuit means includes a transducer for measuring current during the waiting time preceeding the striking of each spark in said series of sparks.

13. The device as claimed in claim 1, wherein said measuring circuit means and said servo circuit means include elements suitable for determining an instantaneous mean voltage value $\overline{U}$, for comparing said instantaneous mean voltage value $\overline{U}$ to a reference value $U_{ref}$, and for modulating movement of said electrode in said feed direction while keeping $\overline{U}$ at about $U_{ref}$.

14. The device as claimed in claim 1, wherein said tool electrode has an active surface very much smaller than that of the cavity to be eroded in said workpiece.

15. The device as claimed in claim 4, wherein said rotary tool electrode includes at least one spiral groove or molding thereon.

16. The device as claimed in claim 15, wherein said at least one groove or molding is disposed parallel to the axis of rotation of said rotary electrode.

17. The device as claimed in claim 4, wherein said rotary tool includes at least one hole or groove in its surface and an internal channel for supplying said portion of said machining fluid to said hole or groove.

18. The device as claimed in claim 17, further comprising an installation for injecting said machining fluid into an end of said channel opposite said workpiece, thereby permitting injection of said portion of said fluid under pressure through said channel, through said hole or groove, and into said machining gap.

19. The device as claimed in claim 4, wherein said rotary tool electrode is quasi-cylindrical, -spherical or -discoid in shape.

20. A process for machining a workpiece by electroerosion having improved circulation of a dielectric liquid between an electrode and said workpiece, in which said electrode is moved with respect to said workpiece in a feed direction, said electrode is spaced from said workpiece a distance defining a machining gap, and a portion of said liquid is circulated in said gap; said process comprising the steps of:

creating a series of sparks between said electrode and said workpiece;

determining the degree of contamination of said portion of said liquid in said machining gap for each spark in said series of sparks; and modulating movement of said electrode in a second direction of movement different from said feed direction as a function of said determined degree of contamination, in such a way as to maintain a critical situation in which the degree of contamination of said portion of said dielectric liquid is slightly less than that which would cause destruction of said dielectric liquid and corresponds to a maximum rate of machining said workpiece;

whereby an electroerosive machining current of a density greater that 10 amp/cm$^2$ is permitted.

21. The process as claimed in claim 20, wherein a current density above 50 amp/cm$^2$ is employed.

22. The process as claimed in claim 20, wherein a current density above 90 amp/cm$^2$ is employed.

23. The process as claimed in claim 20, wherein said process further comprises employing a tool electrode whose volume is very much less than the volume of the cavity to be eroded from the workpiece.

24. The process as claimed in claim 20, wherein the rate of machining said workpiece exceeds 350 mm$^3$/min.

* * * * *